United States Patent
Kim et al.

(10) Patent No.: US 11,204,459 B2
(45) Date of Patent: Dec. 21, 2021

(54) LIGHT PROVIDING UNIT, DISPLAY DEVICE INCLUDING THE SAME, AND METHOD OF MANUFACTURING DISPLAY DEVICE

(71) Applicant: Samsung Display Co., Ltd., Yongin-si (KR)

(72) Inventors: Younggu Kim, Yongin-si (KR); Taekjoon Lee, Hwaseong-si (KR); Sunyoung Chang, Seoul (KR); Jinsoo Jung, Hwaseong-si (KR); Jongmin Ok, Hwaseong-si (KR); Hyelim Jang, Hwaseong-si (KR); Baekkyun Jeon, Yongin-si (KR); Kyungseon Tak, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/177,873

(22) Filed: Feb. 17, 2021

(65) Prior Publication Data
US 2021/0173136 A1    Jun. 10, 2021

Related U.S. Application Data

(62) Division of application No. 16/586,017, filed on Sep. 27, 2019, now Pat. No. 10,948,649.

(30) Foreign Application Priority Data

Nov. 7, 2018  (KR) .......................... 10-2018-0135703

(51) Int. Cl.
*G02F 1/13357*  (2006.01)
*G02B 5/00*  (2006.01)
*F21V 8/00*  (2006.01)

(52) U.S. Cl.
CPC ........... *G02B 6/005* (2013.01); *G02B 6/0065* (2013.01); *G02B 6/0088* (2013.01)

(58) Field of Classification Search
CPC .......................... G02B 6/005; G02F 1/133614
See application file for complete search history.

(56) References Cited

U.S. PATENT DOCUMENTS 10,214,686 B2   2/2019  Dubrow
2009/0257001 A1  10/2009  Sumida et al.
(Continued)

FOREIGN PATENT DOCUMENTS

EP  3 179 524 A1  6/2017
EP  3 240 051 A1  11/2017
(Continued)

OTHER PUBLICATIONS

Notice of Allowance issued in U.S. Appl. No. 16/536,260 by the USPTO, dated Jun. 8, 2020, 9 pages.

*Primary Examiner* — Karabi Guharay
(74) *Attorney, Agent, or Firm* — Lewis Roca Rothgerber Christie LLP

(57) ABSTRACT

A display device includes: a light source configured to generate a light; a display panel configured to display images using the light; a light guide having at least one surface adjacent the light source; and an optical member between the light guide member and the display panel. The optical member includes: a low refractive index layer on a light exit surface of the light guide member; a first cover layer on the low refractive index layer; and a light conversion layer on the first cover layer and configured to convert a wavelength band of an incident light.

7 Claims, 8 Drawing Sheets

(56) References Cited

U.S. PATENT DOCUMENTS

| | | |
|---|---|---|
| 2012/0113672 A1 | 5/2012 | Dubrow et al. |
| 2014/0319995 A1 | 10/2014 | Kim et al. |
| 2016/0109635 A1 | 4/2016 | Lee et al. |
| 2016/0161657 A1 | 6/2016 | Yamada et al. |
| 2017/0222095 A1 | 8/2017 | Yamashita et al. |
| 2017/0321116 A1 | 11/2017 | Satake et al. |
| 2017/0352789 A1 | 12/2017 | Miyanaga et al. |
| 2020/0073039 A1 | 3/2020 | Kim et al. |

FOREIGN PATENT DOCUMENTS

| | | |
|---|---|---|
| JP | 2016-181474 A | 10/2016 |
| JP | 2017-27902 A | 2/2017 |
| JP | 2017-129743 A | 7/2017 |
| KR | 10-2013-0120486 A | 11/2013 |
| KR | 10-2016-0089700 A | 7/2016 |
| KR | 10-2017-0041767 A | 4/2017 |
| KR | 10-2017-0118041 A | 10/2017 |

LIGHT PROVIDING UNIT, DISPLAY DEVICE INCLUDING THE SAME, AND METHOD OF MANUFACTURING DISPLAY DEVICE

CROSS-REFERENCE TO RELATED APPLICATIONS

This application is a divisional of U.S. patent application Ser. No. 16/586,017, filed on Sep. 27, 2019, which claims priority to and the benefit of Korean Patent Application No. 10-2018-0135703, filed on Nov. 7, 2018, in the Korean Intellectual Property Office (KIPO), the disclosure of each of which is incorporated by reference herein in its entirety.

BACKGROUND

1. Field

Embodiments of the present invention relate to a display device, and more particularly, to a display device with improved display quality.

2. Discussion of Related Art

Among display devices, a next-generation advanced display element that has low power consumption, good portability, and high added value is attracting attention. A display device includes a thin film transistor ("TFT") that may control ON/OFF of a voltage for each pixel.

A display device may include a display panel and a light providing unit for providing light to the display panel. The display panel includes an active grid that modulates light emitted from the light providing unit. The light providing unit may include a light source and a light guide plate. Light generated from the light source is guided in the light guide plate and provided to the display panel.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present invention may be directed to a display device having improved durability and display quality.

According to an embodiment, a display device includes: a light source configured to generate a light; a display panel configured to display images using the light; a light guide having at least one surface adjacent the light source; and an optical member between the light guide and the display panel. The optical member includes: a low refractive index layer on a light exit surface of the light guide; a first cover layer on the low refractive index layer; and a light conversion layer on the first cover layer, the light conversion layer being configured to convert a wavelength band of an incident light. The first cover layer includes: a first barrier layer on the low refractive index layer; and a second barrier layer on the first barrier layer, and having a density that is lower than a density of the first barrier layer.

A refractive index of the low refractive index layer may be greater than or substantially equal to about 1.1 and less than or substantially equal to about 1.3.

The first barrier layer may have a refractive index that is higher than a refractive index of the second barrier layer.

The second barrier layer may have a pore density that is higher than a pore density of the first barrier layer.

The first barrier layer and the second barrier layer may include a substantially same material.

The first barrier layer and the second barrier layer may include materials that are different from each other.

Each of the first barrier layer and the second barrier layer may include at least one of $SiO_x$, $SiN_x$, or $SiO_xN_x$.

A sum of thicknesses of the first barrier layer and the second barrier layer may be greater than or substantially equal to about 3000 angstrom (Å).

A sum of thicknesses of the first barrier layer and the second barrier layer may be greater than or substantially equal to about 6000 Å.

A thickness of the first barrier layer may be greater than or substantially equal to about 1200 Å and is less than about 4800 Å.

The display device may further include a second cover layer on the light conversion layer.

The first cover layer may cover a side surface of the low refractive index layer, and the second cover layer may cover a side surface of the light conversion layer.

According to an embodiment, a display device includes: a light source configured to generate a light; a display panel configured to display images using the light; a light guide having at least one surface adjacent the light source; and an optical member between the light guide member and the display panel. The optical member includes: a low refractive index layer on a light exit surface of the light guide; a first cover layer on the low refractive index layer; and a light conversion layer on the first cover layer, the light conversion layer being configured to convert a wavelength band of an incident light. The first cover layer includes: a first barrier layer formed on the low refractive index layer by depositing a first inorganic material at a first temperature; and a second barrier layer formed on the first barrier layer by depositing a second inorganic material at a second temperature that is higher than the first temperature.

The first temperature may be higher than or substantially equal to about 300 degrees (° C.), and the second temperature may be lower than about 300° C.

A thickness of the first barrier layer may be greater than or substantially equal to about 1200 Å and is less than about 4800 Å.

According to an embodiment, a method of manufacturing a display device includes: forming a low refractive index layer patterns on a substrate; forming a first cover layer on the low refractive index layer pattern; and forming a light conversion layer on the first cover layer. Forming of the first cover layer includes: forming a first barrier layer by depositing a first inorganic material on the low refractive index layer pattern at a first temperature for a first time period; and forming a second barrier layer by depositing a second inorganic material on the first barrier layer at a second temperature for a second time period, the second temperature being higher than the first temperature.

Each of the first inorganic material and the second inorganic material may include at least one of $SiO_x$, $SiN_x$, or $SiO_xN_x$.

The first temperature may be higher than or substantially equal to about 300° C., and the second temperature is lower than about 300° C.

The first time period may be more than or substantially equal to about 60 seconds (s) and is less than about 120 s.

According to an embodiment, a light providing unit includes: a light source configured to generate a light; a light guide having at least one surface adjacent the light source; and an optical member on the light guide member. The optical member includes: a low refractive index layer on a light exit surface of the light guide; a barrier layer on the low refractive index layer; and a light conversion layer on the barrier layer, the light conversion layer being configured to convert a wavelength band of an incident light. A density of a first portion of the barrier layer is greater than a density of a second portion of the barrier layer and the second portion of the barrier layer is farther from the low refractive index layer than the first portion of the barrier layer.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present invention will become more apparent by describing in detail embodiments thereof with reference to the accompanying drawings, wherein.

DETAILED DESCRIPTION

Figure 1:
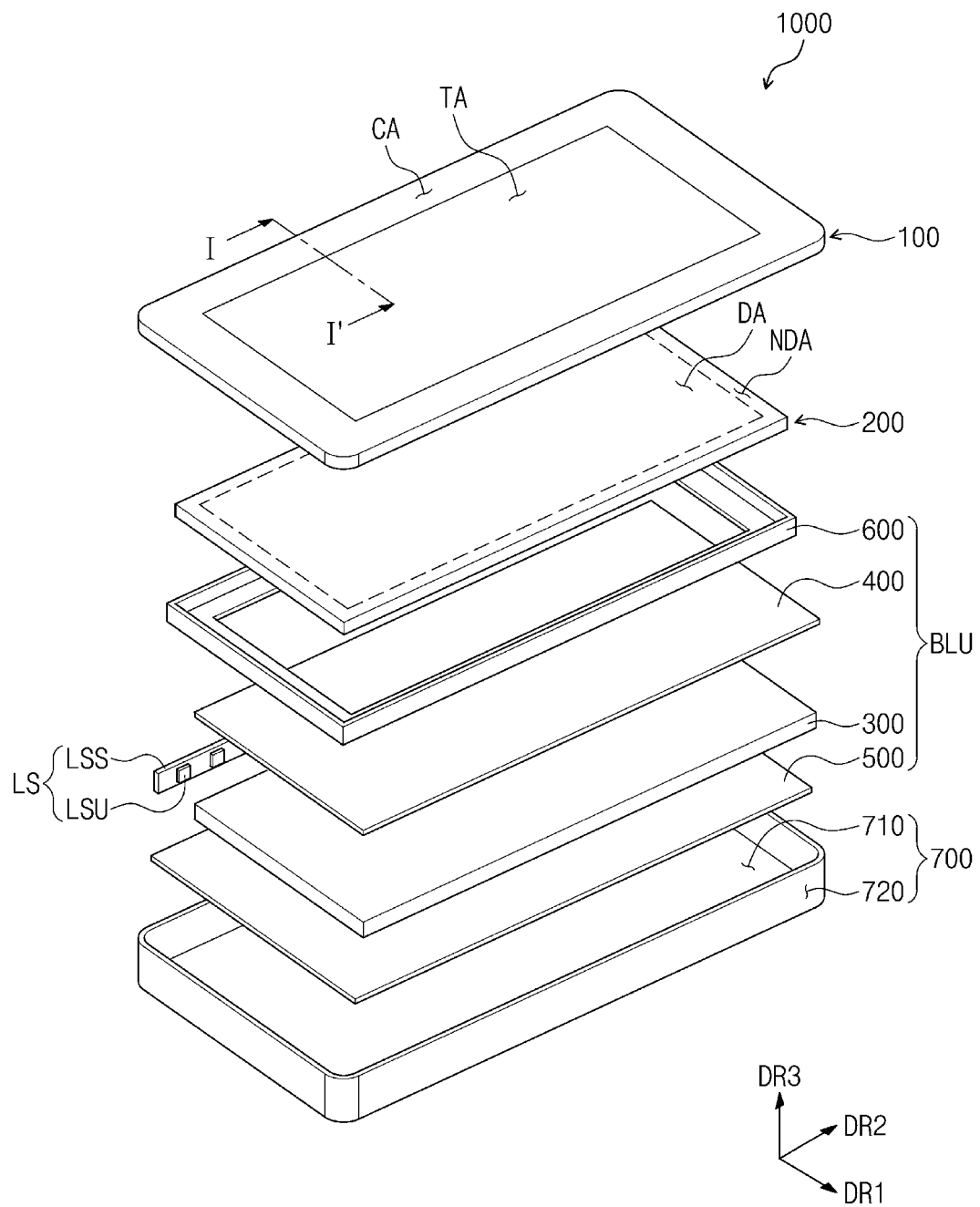
FIG. 1 is an exploded perspective view illustrating a display device according to an embodiment.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The display device, according to embodiments of the present invention described herein, may be implemented utilizing any suitable hardware, firmware (e.g. an application-specific integrated circuit), software, or a combination of software, firmware, and hardware. For example, the display device may include a display member, a light providing unit, and an accommodation member. The display member may be a liquid crystal display (LCD) and the light providing unit may include a light source, a light guide, an optical member, a reflective member, and/or a mold frame. Various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a desirable embodiment according to an embodiment will be described in detail with reference to the accompanying drawings.

Figure 2:
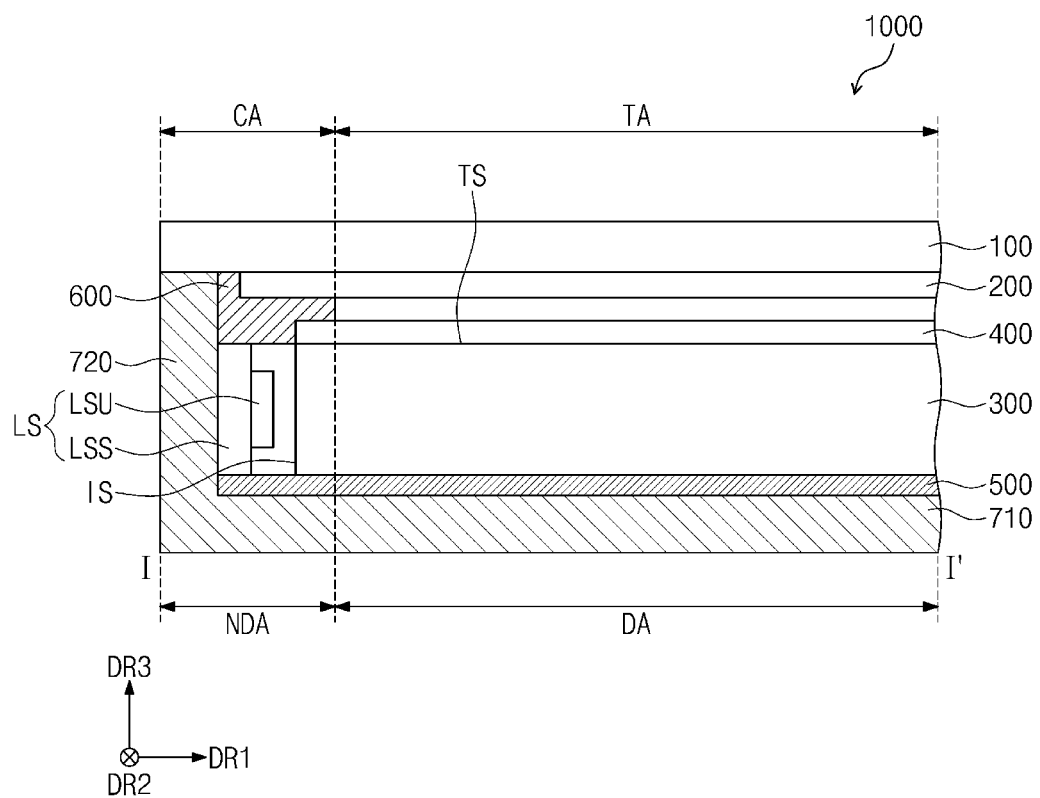
FIG. 2 is a cross-sectional view taken along the line I-I' illustrated in FIG. 1.

FIG. 1 is an exploded perspective view illustrating a display device according to an embodiment, and FIG. 2 is a cross-sectional view taken along the line I-I' illustrated in FIG. 1.

Referring to FIGS. 1 and 2, a display device 1000 according to an embodiment has a quadrangular shape having a short side in a first direction DR1 and a long side in a second direction DR2. However, a display device 1000 according to another embodiment is not limited thereto, and may have various suitable shapes as is understood by those skilled in the art.

The display device 1000 includes a window member (or a window) 100, a display member (or a display) 200, a light providing unit (or a backlight) BLU, and an accommodation member 700.

For convenience of description, a direction in which images are provided in the display device 1000 is defined as an upward direction, and a direction opposite to the upward direction is defined as a downward direction. In the present embodiment, the upward and downward directions are parallel to a third direction DR3 which is defined as a direction orthogonal to a first direction DR1 and a second direction DR2. The third direction DR3 may be a reference direction that distinguishes between a top surface and a bottom surface of elements to be described below. However, the upward direction and the downward direction may be converted into different directions as a relative concept.

The window member 100 includes a transmissive portion TA for transmitting the image provided from the display member 200, and a light blocking portion CA adjacent to the transmissive portion TA and through which no image is transmitted. The transmissive portion TA is located at a center portion of the display device 1000 on a plane defined by the first direction DR1 and the second direction DR2. The light blocking portion CA is disposed around the transmissive portion TA and has a frame shape enclosing (e.g., surrounding in a plane) the transmissive portion TA. However, embodiments are not limited thereto. According to another embodiment, the window member 100 may include only the transmissive portion TA, in which case the light blocking portion CA is not included.

The window member 100 may include a material that includes glass, sapphire, plastic, or any other suitable transparent material as would be understood by those skilled in the art.

The display member 200 is disposed below the window member 100. The display member 200 displays images using a light provided from the light providing unit BLU. That is, the display member 200 may include a light receiving-type display panel. According to an embodiment, the display member 200 may include a liquid crystal display ("LCD") panel, for example.

In a plan view, a surface of the display member 200 on which images are displayed is defined as a display surface. The display surface includes a display area DA where images are displayed and a non-display area NDA where no image is displayed. The display area DA may be defined at a center portion of the display member 200 in the plan view, and may overlap the transmissive portion TA of the window member 100.

The light providing unit BLU is disposed below the display member, and provides light to the display member 200. According to the present embodiment, the light providing unit BLU may be an edge-type light providing unit. However, embodiments are not limited thereto. For example, the light providing unit BLU may be a full array backlight, which may include an array of light emitting diodes (LEDs) corresponding to the pixels of the display member 200. According to another embodiment, although not illustrated in the drawings, the light providing unit BLU may be a direct-type light providing unit, for example.

The light providing unit BLU according to the present embodiment includes a light source LS, a light guide member 300, an optical member 400, a reflective member 500, and a mold frame 600.

The light source LS (e.g., an edge-type light source) is disposed adjacent to one side surface of the light guide member 300 in the first direction DR1. However, embodiments are not limited to the position of the light source LS, and the light source LS may be disposed adjacent to at least one of the side surfaces of the light guide member 300.

The light source LS includes a plurality of light source units LSU and a light source substrate LSS.

The light source units LSU generate light to be provided to the display member 200 and provide the light to the light guide member 300.

According to an embodiment, the light source units LSU may generate a first light. The first light may have a first wavelength band. For example, the first wavelength band may be greater than or substantially equal to about 400 nm and less than or substantially equal to about 500 nm. That is, the light source units LSU may generate a substantially blue light, however, the wavelength band is not so limited and any suitable wavelength band may be used as is understood by those skilled in the art.

According to an embodiment, the light source units LSU may be light emitting diodes ("LEDs") each of which is used as a point light source. However, the present invention is not limited to the type of the light source units LSU.

In addition, the present invention is not limited to the number of light source units LSU. According to another embodiment, the light source unit LSU may be provided as a point light source having a single LED, rather than a plurality of LEDs, or may be provided as a plurality of LED groups. In addition, according to another embodiment, the light source units LSU may be line light sources such as a plurality of LEDs that form a line or cold-cathode fluorescent lamps.

The light source units LSU may be mounted on the light source substrate LSS. The light source substrate LSS is disposed facing one side of the light guide member 300 in the first direction DR1 and extends in the second direction DR2. However, embodiments are not particularly limited to the shape and arrangement relationship of the light source LS and the light source substrate LSS.

The light source substrate LSS may include a light source controller connected to the light source units LSU. The light source controller may analyze the image to be displayed on the display member 200 to output a local dimming signal, and control a brightness of the light generated by the light source units LSU in response to the local dimming signal. For example, the light source controller may be configured to control the brightness of the light generated by individual light source units LSU or multiple light source units LSU grouped together in zones, and each of the zones may correspond to an area of the display member 200. In another embodiment, the light source controller may be mounted on a separate circuit board and its position is not particularly limited.

The light guide member 300 includes a material that has a high light transmittance in the visible light range. For example, the light guide member 300 may include a glass material. In another embodiment, the light guide member 300 may include a transparent polymer resin such as polymethyl methacrylate ("PMMA"). In the present embodiment, the light guide member 300 may have a refractive index higher than or substantially equal to about 1.4 or lower than or substantially equal to about 1.55.

Figure 4:
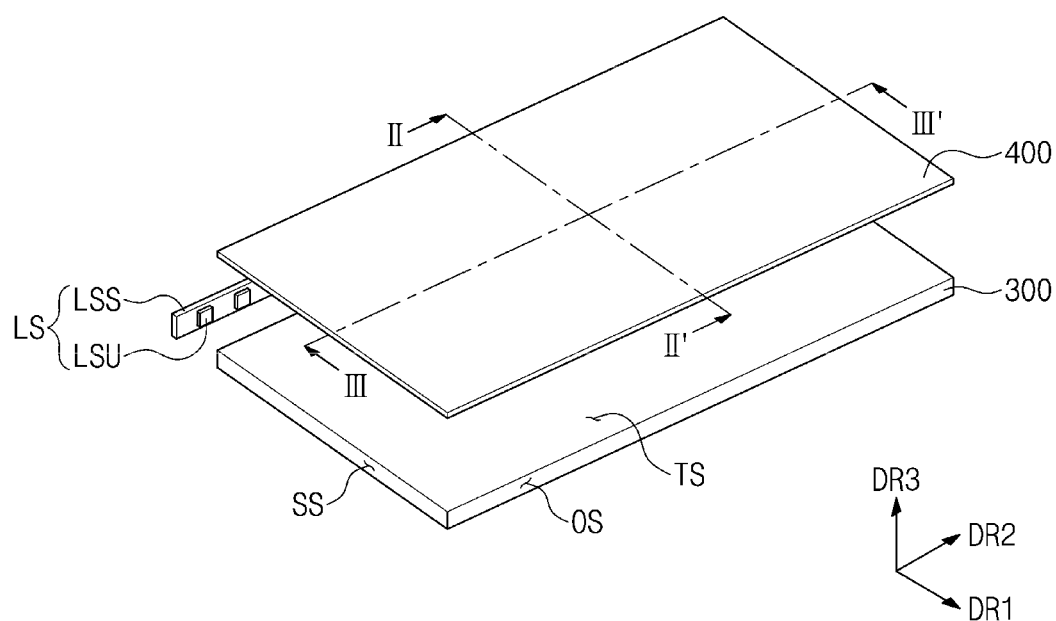
FIG. 4 is a perspective view illustrating a light guide member and an optical member according to an embodiment.

The light guide member 300 includes a light exit surface TS, a bottom surface, and a plurality of side surfaces IS, SS, and OS (as shown in FIGS. 2 and 4). A side surface that is adjacent to the light source LS may be referred to as a light incidence surface IS, and a side surface that opposes the light incidence surface IS may be referred to as a light opposing surface OS.

Although not illustrated in the drawing, the light guide member 300 may include a plurality of light emission patterns formed on the light exit surface TS or the bottom surface. The light emission patterns serve to refract the light incident to the light exit surface TS or the bottom surface of the light guide member 300, and change a reflection angle thereof. The light emission patterns may have a depressed or embossed shape on the light exit surface TS or the bottom surface.

The optical member 400 is disposed on the light guide member 300. A lower surface of the optical member 400 contacts an upper surface of the light guide member 300. The optical member 400 will be described in more detail below with reference to FIGS. 4 to 6.

The reflective member 500 is disposed below the light guide member 300.

The reflective member 500 reflects the light emitted in a direction below the light guide member 300 in an upward direction. The reflective member 500 includes a material that reflects light. For example, the reflective member 500 may include aluminum, silver, or any other suitable reflective material as would be understood by those skilled in the art.

Although not illustrated in the drawing, the light providing unit BLU may further include at least one optical sheet disposed between the optical member 400 and the display member 200. When a plurality of optical sheets are provided, the plurality of optical sheets may include a diffusion sheet, a prism sheet, and a protective sheet. The diffusion sheet may diffuse the light provided from the optical member 400. The prism sheet is disposed on the diffusion sheet, and serves to collimate the light diffused by the diffusion sheet in an upward direction perpendicular to a plane. The protective sheet may protect prisms of the prism sheet from external friction. The number and type of the optical sheets of the present invention are not limited.

The mold frame 600 is disposed between the display member 200 and the optical member 400. In the case of the display device 1000 including the above-described optical sheets, the mold frame 600 may be disposed between the optical sheets and the optical member 400.

According to an embodiment, the mold frame 600 has a frame shape. For example, the mold frame 600 may be disposed corresponding to an edge area on an upper surface of the optical member 400. In such an embodiment, the mold frame 600 does not overlap the display area DA. The display member 200 is disposed on the mold frame 600. The mold frame 600 serves to secure the display member 200 and the light providing unit BLU.

The accommodation member 700 is disposed at a lowermost end of the display device 1000 to accommodate the light providing unit BLU. The accommodation member 700 includes a bottom portion 710 and a plurality of side wall portions 720 connected to the bottom portion 710. In an embodiment, the light source LS may be disposed on an inner side surface of one of the side wall portions 720 of the accommodation member 700. The accommodation member 700 may, for example, include a rigid metal material.

Figure 3:
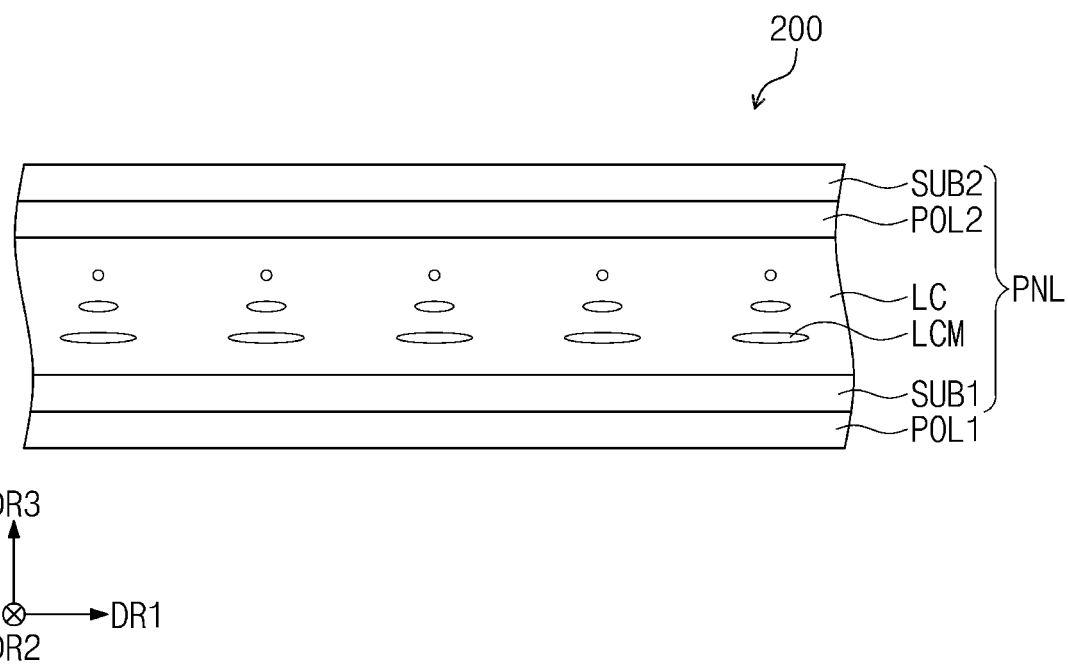
FIG. 3 is a cross-sectional view enlarging a display member according to an embodiment.

FIG. 3 is a magnified cross-sectional view of a display member according to an embodiment.

Referring to FIG. 3, the display member 200 includes a first polarizing layer POL1 and a display panel PNL. The first polarizing layer POL1 is disposed between the display panel PNL and the light providing unit BLU, and polarizes a component of the light provided from the light providing unit BLU. The first polarizing layer POL1 may have a transmission axis having a direction (e.g., a predetermined direction).

The display panel PNL is disposed on the first polarizing layer POL1 to display images through the display area DA (FIGS. 1 and 2). As described above, the display panel PNL may be a light receiving-type display panel. For example, according to an embodiment, the display panel PNL may be a liquid crystal display ("LCD") panel.

The display panel PNL includes a first substrate SUB1, a second polarizing layer POL2, a second substrate SUB2, and a liquid crystal layer LC.

The first substrate SUB1 is disposed on the first polarizing layer POL1. The first substrate SUB1 may include a material that has a high (e.g., relatively high) light transmittance so as to easily transmit the light provided from the light providing unit BLU. For example, the first substrate SUB1 may be a transparent glass substrate, a transparent plastic substrate, a transparent film, or any other suitable transparent material as would be understood by those skilled in the art.

Although not illustrated, at least one pixel area and a non-pixel area adjacent to the pixel area are defined on the first substrate SUB1 in a plan view. In such an embodiment, a plurality of pixel areas are provided, and a non-pixel area may be defined between the pixel areas.

Pixels may be disposed in the pixel areas of the first substrate SUB1, respectively. The pixels may include a plurality of pixel electrodes and a plurality of thin film transistors electrically connected in one-to-one correspondence with the pixel electrodes. The thin film transistors may each be connected to corresponding one of the pixel electrodes to switch a driving signal provided to each of the pixel electrodes.

The second substrate SUB2 is disposed on the first substrate SUB1, and opposes (e.g., is opposite to or faces) the first substrate SUB1. The liquid crystal layer LC may be interposed between the second substrate SUB2 and the first substrate SUB1. The liquid crystal layer LC includes a plurality of liquid crystal molecules LCM arranged (e.g., arranged in a predetermined direction).

The second substrate SUB2 may include a common electrode to form an electric field for controlling arrangement of the liquid crystal molecules LCM together with the pixel electrodes. The display member drives the liquid crystal layer LC to display images in the third direction DR3 which is the upward direction.

Although not illustrated, a driving chip for providing the driving signal, a tape carrier package for mounting thereon a driving chip, and a printed circuit board electrically connected to the display panel PNL through the tape carrier package may be provided at the display member 200.

The second polarizing layer POL2 is disposed between the liquid crystal layer LC and the second substrate SUB2. However, the present invention is not limited to the position of the second polarizing layer POL2 illustrated in FIG. 3. For example, according to another embodiment, the second polarizing layer POL2 may be disposed on the second substrate SUB2.

In the present embodiment, the second polarizing layer POL2 may be a wire grid polarizer. Although not illustrated in the drawing, the second polarizing layer POL2 may include a plurality of nanowires that include a metal material. However, the present invention is not limited to the specific shape and the material of the second polarizing layer POL2.

The second polarizing layer POL2 may have an absorption axis (e.g., an absorption axis having a predetermined direction). When a display mode of the display device 1000 is light, the second polarizing layer POL2 transmits light, and when the display mode of the display device 1000 is dark, the second polarizing layer POL2 absorbs light.

According to the present embodiment, an angle between the transmission axis of the first polarizing layer POL1 and the absorption axis of the second polarizing layer POL2 may be set according to an arrangement mode of the liquid crystal molecules. For example, the transmission axis of the first polarizing layer POL1 may be orthogonal to the absorption axis of the second polarizing layer POL2 in a plan view.

Figure 5A:
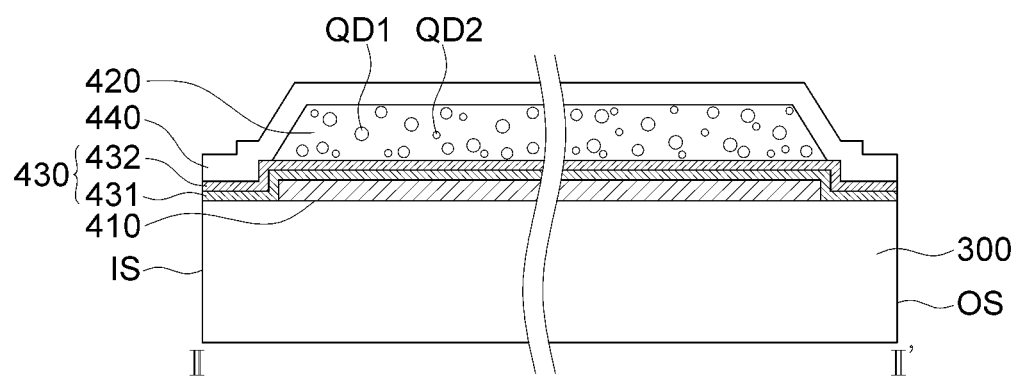
FIG. 5A is a cross-sectional view taken along the line II-II' illustrated in FIG. 4.
Figure 5B:
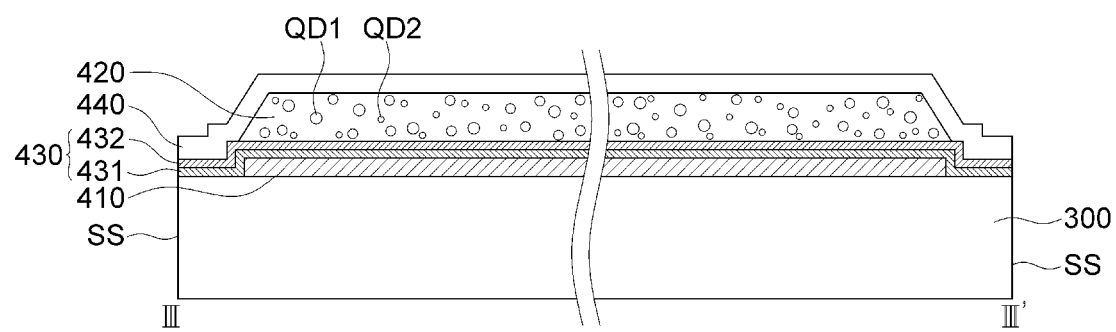
FIG. 5B is a cross-sectional view taken along the line III-III' illustrated in FIG. 4.
Figure 5C:
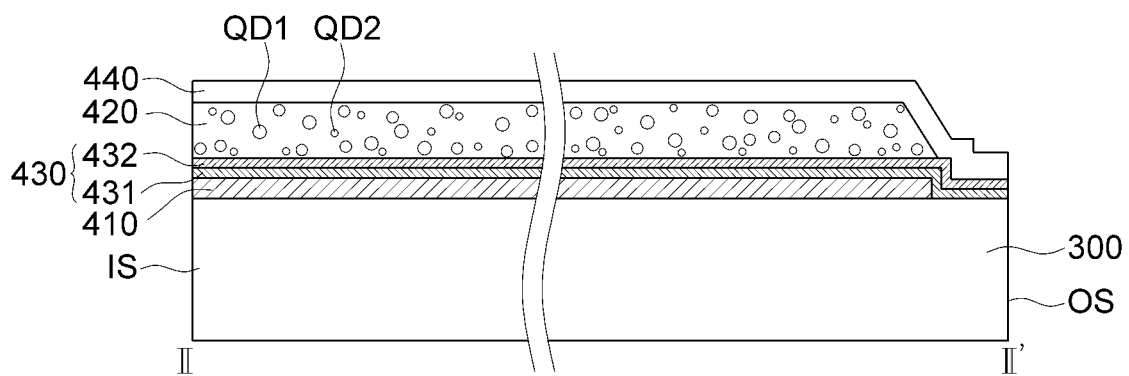
FIG. 5C is a cross-sectional view taken along the line II-II' illustrated in FIG. 4.

FIG. 4 is a perspective view illustrating a light guide member and an optical member according to an embodiment, FIG. 5A is a cross-sectional view taken along the line II-II' illustrated in FIG. 4, FIG. 5B is a cross-sectional view taken along the line III-III' illustrated in FIG. 4, and FIG. 5C is a cross-sectional view taken along the line II-II' illustrated in FIG. 4.

Referring to FIGS. 4 to 5C, the optical member 400 includes a low refractive index layer 410, a light conversion layer 420, a first cover layer 430, and a second cover layer 440.

The low refractive index layer 410 is disposed on the light exit surface TS (e.g., the light exit surface TS of FIG. 2) of the light guide member 300. The low refractive index layer 410 has a refractive index that is lower than a refractive index of the light guide member 300. For example, the refractive index of the low refractive index layer 410 may be higher than or substantially equal to about 1.1 and lower than or substantially equal to about 1.3. The low refractive index layer 410 forms a refractive index difference at an interface between the low refractive index layer 410 and the light guide member 300 so that the light provided from the light source LS to the light guide member 300 may be reflected (e.g., totally reflected) in the light guide member 300.

Although not illustrated in the drawings, the low refractive index layer 410 may include a plurality of pores. The refractive index of the low refractive index layer 410 may be adjusted according to a density of pores. For example, as the number of pores included in the low refractive index layer 410 increases, the refractive index of the low refractive index layer 410 may decrease.

According to the present embodiment, a thickness of the low refractive index layer 410 may be greater than or substantially equal to about 0.5 μm. Unlike the present embodiment, in a case where the thickness of the low refractive index layer 410 is less than about 0.5 μm, light that satisfies the reflection condition (e.g., the total reflection condition) among the light provided to the light guide member 300 may not be totally reflected in the light guide member 300, and may therefore be incident to the light conversion layer 420 through the low refractive index layer 410.

The low refractive index layer 410 overlaps a part of the light exit surface TS of the light guide member 300. An area of an upper surface of the low refractive index layer 410 may be less than an area of the light exit surface TS of the light guide member 300. Accordingly, a part of the light exit surface TS of the light guide member 300 where the low refractive index layer 410 is not disposed may be exposed in a plan view by the low refractive index layer 410. The exposed area may overlap an edge area of the light exit surface TS of the light guide member 300.

The light conversion layer 420 is disposed on the low refractive index layer 410. The light conversion layer 420 has a refractive index that is higher than that of the light guide member 300. For example, the refractive index of the light conversion layer 420 may be greater than or substantially equal to about 1.65.

The light conversion layer 420 converts a wavelength band of the incident light. The light conversion layer 420 according to an embodiment may include a plurality of conversion particles QD1 and QD2. Each of the conversion particles QD1 and QD2 absorbs at least a part of the incident light and emits a light having a color associated with the conversion particles (e.g., a specific color), or transmits the light as it is.

For example, in a case where a light incident to the light conversion layer 420 has a sufficient energy to excite the conversion particle, the conversion particle absorbs at least a part of the incident light and becomes excited, and the conversion particle stabilizes and in the process of stabilizing, emits a light of a specific color. In a case where the incident light has an energy that is insufficient to excite the conversion particles, the incident light may pass through the light conversion layer 420 as it is and be visible from the outside.

The color of the light emitted by a conversion particle may vary according to a particle size of the conversion particles In general, as the particle size increases, a light having a longer wavelength is generated, and as the particle size decreases, a light having a shorter wavelength is generated.

For example, according to an embodiment, each of the conversion particles may be a quantum dot. The light emitted from the conversion particles of the light conversion layer 420 may be emitted in various directions.

For example, the conversion particles include first quantum dots QD1 and second quantum dots QD2. Each of the first quantum dots QD1 may absorb the first light and convert it into a second light having a second wavelength band. A center wavelength of the second wavelength band may be greater than a center wavelength of the first wavelength band. For example, the second wavelength band may be more than or substantially equal to about 640 nm and less than or substantially equal to about 780 nm. That is, each of the first quantum dots QD1 may substantially convert blue light into red light.

Each of the second quantum dots QD2 may absorb the first light, and convert it into a third light having a third wavelength band. A center wavelength of the third wavelength band is greater than the center wavelength of the first wavelength band, and less than a center wavelength of the second wavelength band. For example, the third wavelength band may be greater than or substantially equal to about 480 nm and less than or substantially equal to about 560 nm. That is, each of the second quantum dots QD2 may substantially convert blue light into green light.

As described above, the wavelength of the light generated by the conversion particles may be determined according to the particle size of the corresponding conversion particles. According to the present embodiment, a size of each of the first quantum dots QD1 may be larger than a size of each of the second quantum dots QD2.

Although not illustrated in the drawings, the light conversion layer 420 may further include scatterers. The scatterers may be mixed with the first quantum dots QD1 and the second quantum dots QD2.

The first cover layer 430 is disposed between the low refractive index layer 410 and the light conversion layer 420. The first cover layer 430 is disposed on the low refractive index layer 410 and contacts (e.g., directly contacts) the low refractive index layer 410. For example, the first cover layer 430 covers an upper surface and side surfaces of the low refractive index layer 410. The first cover layer 430 according to the present embodiment may include an inorganic material. For example, the first cover layer 430 may include silicon oxide ($SiO_x$), silicon nitride ($SiN_x$), and/or silicon oxide nitride ($SiO_xN_x$).

Referring to FIGS. 5A and 5B, the low refractive index layer 410 according to an embodiment may be disposed at a center portion of an area on the light exit surface TS (e.g., the light exit surface TS of FIG. 2). Accordingly, a portion of the area on the light exit surface TS that does not overlap the low refractive index layer 410 may have a frame shape. The first cover layer 430 covers the upper surface and all side surfaces of the low refractive index layer 410. In addition, the first cover layer 430 may directly contact an edge area on the light exit surface TS of the light guide member 300 that does not overlap the low refractive index layer 410.

Referring to FIG. 5C, the first cover layer 430 may cover only some of the side surfaces of the low refractive index layer 410. For example, one side surface of the low refractive index layer 410 that is adjacent to the light source LS is not covered by the first cover layer 430. The other side surfaces of the low refractive index layer 410 (e.g., not the one side surface) are covered by the first cover layer 430. A portion of the area on the light exit surface TS of the light guide member 300 that does not overlap the low refractive index layer 410 is covered by the first cover layer 430. The portion that does not overlap the low refractive index layer 410 may directly contact the first cover layer 430.

The first cover layer 430 may include a first barrier layer 431 disposed on the low refractive index layer 410, and a second barrier layer 432 disposed on the first barrier layer 431. The first barrier layer 431 and the second barrier layer 432 may completely overlap each other.

The first barrier layer 431 may be formed by deposition on the low refractive index layer 410 at a first temperature for a first time period. The second barrier layer 432 may be formed by deposition on the first barrier layer 431 at a second temperature for a second time period.

Each of the first barrier layer 431 and the second barrier layer 432 may include an inorganic material. For example, each of the first barrier layer 431 and the second barrier layer 432 may include silicon oxide ($SiO_x$), silicon nitride ($SiN_x$), silicon oxide nitride ($SiO_xN_x$), and/or any other suitable material as would be understood by those skilled in the art.

The first barrier layer 431 and the second barrier layer 432 may include a substantially same material. Alternatively, the first barrier layer 431 and the second barrier layer 432 may include different materials, respectively. For example, according to an embodiment, the first barrier layer 431 may include any one of silicon oxide ($SiO_x$), silicon nitride ($SiN_x$), and silicon oxide nitride ($SiO_xN_x$), and the second barrier layer 432 may include another of silicon oxide ($SiO_x$), silicon nitride ($SiN_x$), and silicon oxide nitride ($SiO_xN_x$).

According to an embodiment, the first temperature at which the first barrier layer 431 is deposited is higher than the second temperature at which the second barrier layer 432 is deposited. For example, the first temperature at which the first barrier layer 431 is deposited may be higher than or substantially equal to about 250° C. In some embodiments, the first temperature may be about 300° C. or higher, and in some embodiments, about 350° C. or higher. In some embodiments, the first temperature may be about 500° C. or lower, and in some embodiments, about 400° C. or lower. In some embodiments, the second temperature at which the second barrier layer 432 is deposited may be lower than about 250° C. For example, the second temperature may be about 200° C.

According to an embodiment, a thickness of the first barrier layer 431 may be greater than or substantially equal to about 600 Å and less than about 6000 Å. For example, the thickness of the first barrier layer 431 may be greater than or substantially equal to about 1200 Å and less than about 4800 Å. A thickness of the second barrier layer 432 may be greater than or substantially equal to about 1200 Å.

A sum of the thicknesses of the first barrier layer 431 and the second barrier layer 432 may be about 3000 Å or more. According to an embodiment, the sum of the thickness may be about 5000 Å or more, and in another embodiment, about 6000 Å or more.

The first cover layer 430 that includes the first barrier layer 431 and the second barrier layer 432 may have moisture barrier properties. A water vapor transmission rate ("WVTR") of the first cover layer 430 measured under a relative humidity condition of 90% at 38° C. in accordance with a standard testing method for water vapor transmission such as ASTM F 1249, is less than or substantially equal to about 1.1 g/m²/day, and may be less than or substantially equal to about 0.4 g/m²/day.

According to an embodiment, a density of the first barrier layer 431 may be greater than a density of the second barrier layer 432. For example, the density of the first barrier layer 431 may be greater than the density of the second barrier layer 432 by about 0.1 g/cm$^3$ or more, and in some embodiments by about 0.2 g/cm$^3$ or more. According to an embodiment, the density of the first barrier layer 431 may be greater than the density of the second barrier layer 432 by about 0.3 g/cm$^3$ or more.

For example, each of the first barrier layer 431 and the second barrier layer 432 may include SiO$_x$, and the density of the first barrier layer 431 may be in a range from about 2.3 g/cm$^3$ to about 2.5 g/cm$^3$. In addition, the density of the second barrier layer 432 may be in a range from about 2.1 g/cm$^3$ to about 2.3 g/cm$^3$.

For example, each of the first barrier layer 431 and the second barrier layer 432 may include SiN$_x$, and the density of the first barrier layer 431 may be in a range from about 2.3 g/cm$^3$ to about 2.7 g/cm$^3$. In addition, the density of the second barrier layer 432 may be in a range from about 2.0 g/cm$^3$ to about 2.3 g/cm$^3$.

Alternatively, each of the first barrier layer 431 and the second barrier layer 432 may include bond structures of Si—OH and Si—H, and a Si—OH bond ratio of the first barrier layer 431 may be greater than a Si—OH bond ratio of the second barrier layer 432. For example, in an area of a FP—IR peak, the Si—OH bond ratio of the first barrier layer 431 may be greater than the Si—OH bond ratio of the second barrier layer 432 by a range from about 5% to about 50%.

Alternatively, each of the first barrier layer 431 and the second barrier layer 432 may include bond structures of Si—N, N—H and Si—H, and a Si—N bond ratio of the first barrier layer 431 may be greater than a Si—N bond ratio of the second barrier layer 432. For example, in an area of a FP—IR peak, the Si—N bond ratio of the first barrier layer 431 may be greater than the Si—N bond ratio of the second barrier layer 432 by a range from about 5% to about 50%.

According to an embodiment, a refractive index of the first barrier layer 431 may be greater than a refractive index of the second barrier layer 432.

For example, each of the first barrier layer 431 and the second barrier layer 432 may include SiO$_x$, and the refractive index of the first barrier layer 431 may be in a range from about 1.46 to about 1.50. In addition, the refractive index of the second barrier layer 432 may be in a range from about 1.42 to about 1.46. For example, the refractive index of the first barrier layer 431 may be greater than the refractive index of the second barrier layer 432 by about 0.04 or more.

For example, each of the first barrier layer 431 and the second barrier layer 432 may include SiN$_x$, and the refractive index of the first barrier layer 431 may be in a range from about 1.90 to about 2.10. In addition, the refractive index of the second barrier layer 432 may be in a range from about 1.80 to about 1.90. For example, the refractive index of the first barrier layer 431 may be greater than the refractive index of the second barrier layer 432 by about 0.1 or more.

In addition, a density of pores included in the first barrier layer 431 may be less than a density of pores included in the second barrier layer 432. For example, the density of pores included in the second barrier layer 432 may be greater than the density of pores included in the first barrier layer 431 by a range from about 5% to about 50%.

The second cover layer 440 is disposed on the light conversion layer 420. The second cover layer 440 may directly contact an upper surface of the light conversion layer 420. The second cover layer 440 may directly contact a side surface of the light conversion layer 420 and an upper surface of the first cover layer.

The second cover layer 440 may include an inorganic material. For example, the second cover layer 440 may include silicon oxide (SiO$_x$), silicon nitride (SiN$_x$), and/or silicon oxide nitride (SiO$_x$N$_x$). The second cover layer 440 protects the light conversion layer 420 from the outside to prevent the conversion particles QD1 and QD2 of the light conversion layer 420 from deteriorating.

In the present embodiment, the second cover layer 440 includes a material that is substantially the same as a material included in the first cover layer 430, but embodiments are not limited thereto. According to another embodiment, the first cover layer 430 and the second cover layer 440 may include inorganic materials that are different from each other.

Although not illustrated, the optical member 400 according to an embodiment may further include a third cover layer. The third cover layer may be disposed on the second cover layer 440 to cover an upper surface of the second cover layer 440. The third cover layer may include an organic material. The third cover layer serves to cover void spaces that may be generated in the second cover layer 440.

Although not illustrated, the first cover layer 430 may further include an adhesive layer.

The adhesive layer may be disposed between the first barrier layer 431 and the light guide member 300 to increase a bonding force between the first barrier layer 431 and the light guide member 300.

Figure 6:
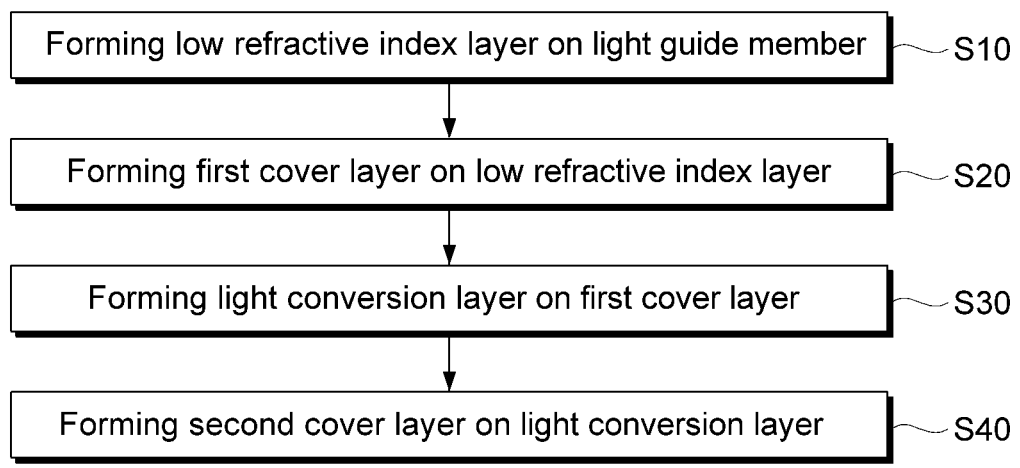
FIG. 6 is a flowchart illustrating a method of manufacturing an optical member according to an embodiment.
Figure 7:
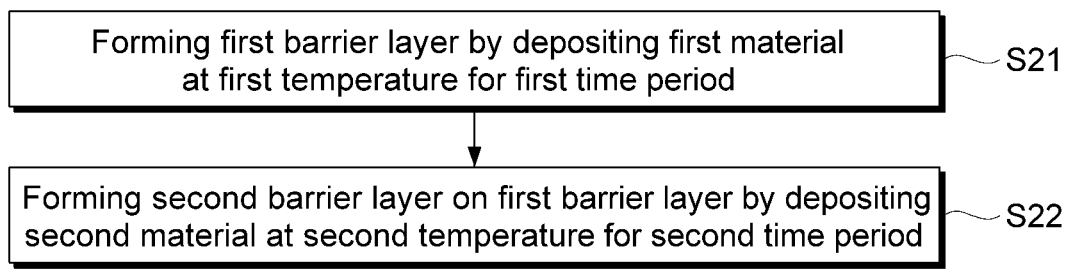
FIG. 7 is a flowchart illustrating a method of manufacturing a first cover layer according to an embodiment.

FIG. 6 is a flowchart illustrating a method of manufacturing an optical member according to an embodiment, and FIG. 7 is a flowchart illustrating a method of manufacturing a first cover layer according to an embodiment.

Hereinafter, with reference to FIGS. 6 and 7, a method of manufacturing the optical member 400 according to an embodiment will be described.

First, the low refractive index layer 410 is formed on the light guide member 300 (S10). For example, a preliminary solution serving as a material for forming the low refractive index layer 410 is applied on the light guide member 300. For example, the preliminary solution may include a hollow silica and/or a silica polymer. The low refractive index layer 410 is formed with the applied preliminary solution through a post-treatment process. For example, the post-treatment process may include a post-heat treatment process. The post-heat treatment process may be conducted at a temperature of less than about 250° C. A plurality of pores may be generated in the low refractive index layer pattern 410 through the post-treatment process. A refractive index of the low refractive index layer pattern 410 may be set by controlling the density of pores included in the low refractive index layer pattern 410.

Next, the first cover layer 430 is formed on the low refractive index layer pattern 410 (S20). The first cover layer 430 may cover an upper surface and all side surfaces of the low refractive index layer 410. In some embodiments, the first cover layer 430 may cover only the upper surface and a part of the side surfaces of the low refractive index layer 410. Forming of the first cover layer 430 (S20) will be described below with reference to FIG. 7.

Next, the light conversion layer 420 is formed on the first cover layer 430 (S30). The light conversion layer 420 includes the plurality of conversion particles QD1 and QD2. For example, the conversion particles QD1 and QD2 may be quantum dots.

Next, the second cover layer 440 is formed on the light conversion layer 420 (S40). The second cover layer 440 may cover an upper surface and all side surfaces of the light conversion layer 420. In some embodiments, the second cover layer 440 may cover only the upper surface and a part of the side surfaces of the light conversion layer 420. The second cover layer 440 may include an inorganic material. For example, the second cover layer 440 may include silicon oxide ($SiO_x$), silicon nitride ($SiN_x$), and/or silicon oxide nitride ($SiO_xN_x$). However, the present invention is not particularly limited to the material of the second cover layer 440.

Referring to FIG. 7, forming of the first cover layer 430 (S20) may include forming the first barrier layer 431 on the low refractive index layer 410 (S21), and forming the second barrier layer 432 on the first barrier layer 431 (S22). The first barrier layer 431 is formed by depositing a first material on the low refractive index layer 410 at a first temperature for a first time period (S21). The second barrier layer 432 is formed by depositing a second material on the first barrier layer 431 at a second temperature for a second time period (S22).

The first barrier layer 431 and the second barrier layer 432 may be deposited by chemical vapor deposition ("CVD"). For example, the second barrier layer 432 may be deposited by plasma enhanced chemical vapor deposition ("PECVD").

The first material of the first barrier layer 431 and the second material of the second barrier layer 432 may be inorganic materials. For example, each of the first material and the second material may include silicon oxide ($SiO_x$), silicon nitride ($SiN_x$), and/or silicon oxide nitride ($SiO_xN_x$).

The first material and the second material may be substantially the same material. Alternatively, the first material and the second material may be different materials (e.g., materials that are different from each other). For example, the first material may include one of silicon oxide ($SiO_x$), silicon nitride ($SiN_x$) and silicon oxide nitride ($SiO_xN_x$), and the second material may include another of silicon oxide ($SiO_x$), silicon nitride ($SiN_x$) and silicon oxide nitride ($SiO_xN_x$).

For example, the first barrier layer 431 may include $SiN_x$ deposited by the PECVD method, in which case the first barrier layer 431 may be deposited under process conditions in which a flow rate of $SiH_4$ is about 70 sccm, a flow rate of $NH_3$ is about 610 sccm, a flow rate of $N_2$ is about 3255 sccm, a process pressure is about 1000 mTorr, and a RF power is about 1000 W.

For example, the first barrier layer 431 may include $SiO_x$ deposited by the PECVD method, in which case the first barrier layer 431 may be deposited under process conditions in which a flow rate of $SiH_4$ is about 70 sccm, a flow rate of $N_{2O}$ is about 4200 sccm, a process pressure is about 1200 mTorr, and a RF power is about 200 W.

For example, the second barrier layer 432 may include $SiN_x$ deposited by the PECVD method, in which case the second barrier layer 432 may be deposited under process conditions in which a flow rate of $SiH_4$ is about 180 sccm, a flow rate of $NH_3$ is about 1500 sccm, a flow rate of $N_2$ is about 5250 sccm, a process pressure is about 900 mTorr, and a RF power is about 1000 W.

For example, the second barrier layer 432 may include $SiO_x$ deposited by the PECVD method, in which case the second barrier layer 432 may be deposited under process conditions in which a flow rate of $SiH_4$ is about 120 sccm, a flow rate of $N_{2O}$ is about 5800 sccm, a process pressure is about 1000 mTorr, and a RF power is about 200 W.

However, embodiments are not limited thereto, and the flow rate of each gas, the process pressure, and the RF power may be modified according to the material of the low refractive index layer 410, the thicknesses of the first barrier layer 431 and the second barrier layer 432, the deposition temperature, the deposition time, and a plasma energy, as is understood by those skilled in the art.

According to an embodiment, the first temperature at which the first barrier layer 431 is deposited is higher than the second temperature at which the second barrier layer 432 is deposited. For example, the first temperature at which the first barrier layer 431 is deposited may be greater than or substantially equal to about 250° C. For example, the first temperature may be about 300° C. or higher, or about 350° C. or higher. For example, the second temperature at which the second barrier layer 432 is deposited may be less than about 250° C. For example, the second temperature may be about 200° C.

As described above, the first temperature at which the first barrier layer 431 is deposited is relatively high. As described below with reference to FIGS. 8A-9C, deposition of the first barrier layer 431 at the relatively high first temperature may substantially suppress the luminance change of the light providing unit BLU over time.

The first time period for which the first barrier layer 431 is deposited may be in a range from about 30 seconds (s) to about 240 s. For example, the first time period may be in a range from about 60 s to about 120 s. The first barrier layer 431 is deposited at the first temperature that is relatively high. Accordingly, the low refractive index layer 410 which is disposed below the first barrier layer 431 and includes an organic material may be decomposed. Accordingly, in an embodiment, the first time period, that is the deposition time of the first barrier layer 431, is less than a time period after which decomposition of the low refractive index layer 410 starts.

In an embodiment, when the deposition temperature of the first barrier layer 431, i.e., the first temperature, is about 373° C., and the time for which the first barrier layer 431 is deposited, i.e., the first time period, is about 120 s, decomposition of the low refractive index layer 410 may be substantially avoided.

In an embodiment, when the deposition temperature of the first barrier layer 431, i.e., the first temperature, is about 373° C., and the time for which the first barrier layer 431 is deposited, i.e., the first time period, is about 240 s, may cause the start of decomposition of the low refractive index layer 410.

In an embodiment, when the deposition temperature of the first barrier layer 431, i.e., the first temperature, is about 373° C., and the time for which the first barrier layer 431 is deposited, i.e., the first time period, is about 360 s, may cause the considerable decomposition of the low refractive index layer 410.

According to an embodiment, the first time period for which the first barrier layer 431 is deposited is less than about 240 s, and may be less than or substantially equal to about 120 s. However, the first time period for which the first barrier layer 431 is deposited is not limited thereto, and the first time period may be any time period less than a time period after which the low refractive index layer 410 starts to be decomposed according to the material of the low refractive index layer 410, the deposition temperature, the pressure of raw material gas, the plasma energy, and the flow rate of the gas. Such a time period may be determined according to the material of the low refractive index layer 410, the deposition temperature, the pressure of raw material gas, the plasma energy, and the flow rate of the gas.

The thickness of the first barrier layer 431 may be determined according to the first time period for which the first barrier layer 431 is deposited and a deposition rate. According to an embodiment, the first time period is about 120 s, and the deposition rate of the first barrier layer is in a range from about 5 Å/s to about 80 Å/s, more preferably, in a range from about 10 Å/s to about 40 Å/s. According to an embodiment, the thickness of the first barrier layer 431 is in a range from about 1200 Å/s to about 4800 Å/s.

The second barrier layer 432 is deposited on the first barrier layer 431. The second temperature at which the second barrier layer 432 is deposited may be a relatively low temperature at which the low refractive index layer 410 does not decompose.

The following Table 1 shows a water vapor transmission rate ("WVTR") according to the thickness of the barrier layer. Referring to Table 1, a WVTR of the first cover layer 430 may depend on the sum of the thicknesses of the first barrier layer 431 and the second barrier layer 432.

TABLE 1

| Material | Thickness | WVTR |
|---|---|---|
| $SiN_x$ | 1000 Å | 17.3 |
| $SiN_x$ | 2000 Å | 3.6 |
| $SiN_x$ | 3000 Å | 1.1 |
| $SiN_x$ | 4000 Å | 0.4 |
| $SiO_x$ | 1000 Å | 17.3 |
| $SiO_x$ | 2000 Å | 5.8 |
| $SiO_x$ | 3000 Å | 1.7 |
| $SiO_x$ | 4000 Å | 0.4 |

The WVTR of the first cover layer 430 that includes the first barrier layer 431 and the second barrier layer 432 may be less than or substantially equal to about 1.1 g/m²/day, and preferably, less than or substantially equal to about 0.4 g/m²/day.

The sum of the thicknesses of the first barrier layer 431 and the second barrier layer 432 may be about 3000 Å, about 4000 Å, or about 5000 Å or more. More preferably, the sum of the thicknesses of the first barrier layer 431 and the second barrier layer 432 may be greater than or substantially equal to about 6000 Å. Preferably, the sum of the thicknesses of the first barrier layer 431 and the second barrier layer 432 may be in a range from about 5000 Å to about 7000 Å.

As described above, the deposition time may be restricted due to the relatively high deposition temperature of the first barrier layer 431, and accordingly, it may be difficult for the first barrier layer 431 to be formed having a sufficient thickness.

Accordingly, in order to achieve a sufficient thickness of the first cover layer 430, the second barrier layer 432 may be deposited to a required thickness at the relatively low second temperature. For example, the thickness of the second barrier layer 432 may be greater than or substantially equal to about 1200 Å.

As described above, the first barrier layer 431 is deposited at a temperature relatively higher than the temperature at which the second barrier layer 432 is deposited. Accordingly, the density of the first barrier layer 431 may be greater than the density of the second barrier layer 432. In addition, each of the first barrier layer 431 and the second barrier layer 432 may include bond structures of Si—OH and Si—H, and the Si—OH bond ratio of the first barrier layer 431 may be greater than the Si—OH bond ratio of the second barrier layer 432. In addition, each of the first barrier layer 431 and the second barrier layer 432 may include bond structures of Si—N, N—H and Si—H, and the Si—N bond ratio of the first barrier layer 431 may be greater than the Si—N bond ratio of the second barrier layer 432. In addition, the refractive index of the first barrier layer 431 may be greater than the refractive index of the second barrier layer 432. In addition, the density of pores included in the first barrier layer 431 may be less than the density of pores included in the second barrier layer 432.

It has been described hereinabove mainly in respect to the temperatures at which the first barrier layer 431 and the second barrier layer 432 are deposited, but embodiments are not limited thereto. For example, a higher plasma energy or a higher process pressure may be used when depositing the first barrier layer 431 than when depositing the second barrier layer 432.

For example, each of the first barrier layer 431 and the second barrier layer 432 may include $SiN_x$, the first barrier layer 431 may be deposited under process conditions in which the RF power is about 1250 W, and the second barrier layer 432 may be deposited under process conditions in which the RF power is about 1000 W.

For example, each of the first barrier layer 431 and the second barrier layer 432 may include $SiO_x$, the first barrier layer 431 may be deposited under process conditions in which the RF power is about 300 W, and the second barrier layer 432 may be deposited under process conditions in which the RF power is about 200 W.

For example, each of the first barrier layer 431 and the second barrier layer 432 may include $SiN_x$, the first barrier layer 431 may be deposited under process conditions in which the process pressure is about 1600 Torr, and the second barrier layer 432 may be deposited under process conditions in which the process pressure is about 1000 Torr.

For example, each of the first barrier layer 431 and the second barrier layer 432 may include $SiO_x$, the first barrier layer 431 may be deposited under process conditions in which the process pressure is about 1500 Torr, and the second barrier layer 432 may be deposited under process conditions in which the process pressure is about 1200 Torr.

However, embodiments are not limited thereto, and the respective process pressures and RF powers may be modified according to the deposition conditions such as the material of the low refractive index layer 410, the thicknesses of the first barrier layer 431 and the second barrier layer 432, the deposition temperature, and the deposition time.

In addition, although the first cover layer 430 has been described as including the first barrier layer 431 and the second barrier layer 432 in the above description, the first cover layer 430 according to an embodiment may include a third barrier layer disposed on the second barrier layer 432. The third barrier layer may have a lower density or may be deposited at a lower temperature than those of the second barrier layer.

In addition, the first barrier layer 431 and the second barrier layer 432 may be a single barrier layer. In an embodiment with a single barrier layer, a first portion of the barrier layer relatively close to the low refractive index layer 410 may have a density greater than a density of a second portion of the barrier layer relatively farther from the low refractive index layer 410. The single barrier layer may have a density that decreases (e.g., continuously decreases) as a distance from the low refractive index layer 410 increases. In addition, such a barrier layer may be deposited at a deposition temperature that continuously decreases.

FIGS. 8A-9C are graphs showing changes in luminance over time according to a material and a deposition temperature of the first barrier layer 431.

Figure 8A:
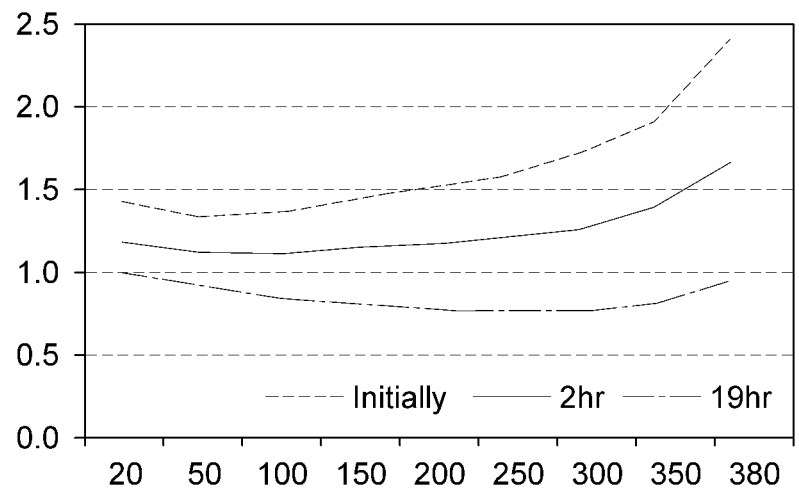
FIGS. 8A-9C are graphs showing changes in luminance over time according to a material and a deposition temperature of a first barrier layer.
Figure 8B:
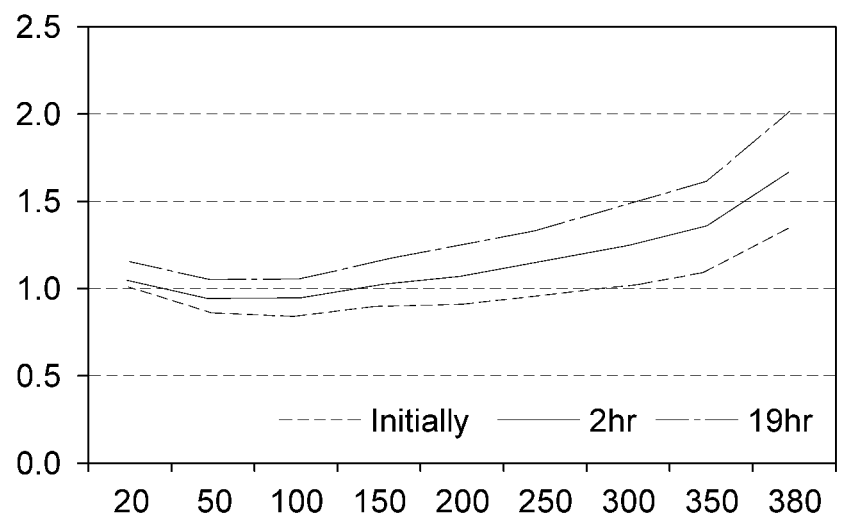
Figure 8C:
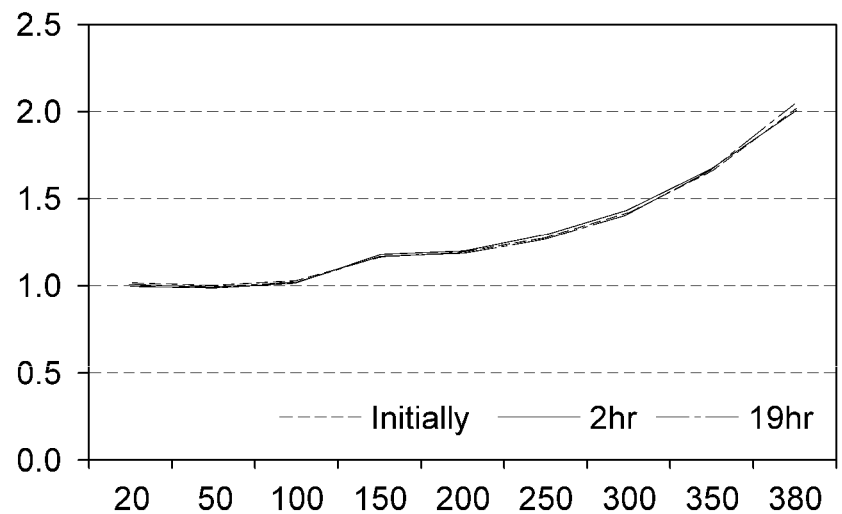
Figure 9A:
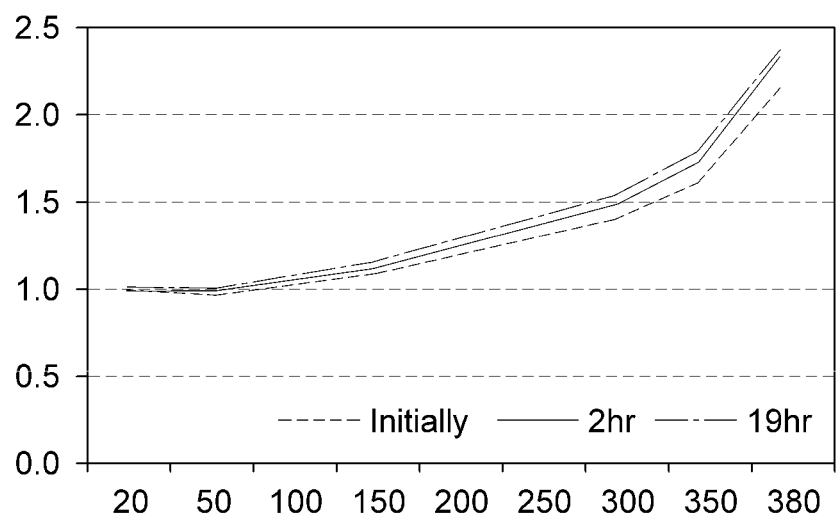
Figure 9B:
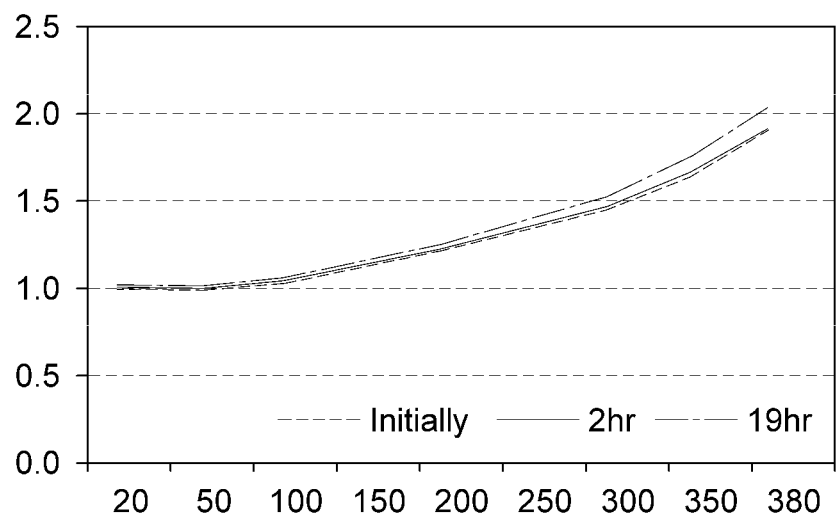
Figure 9C:
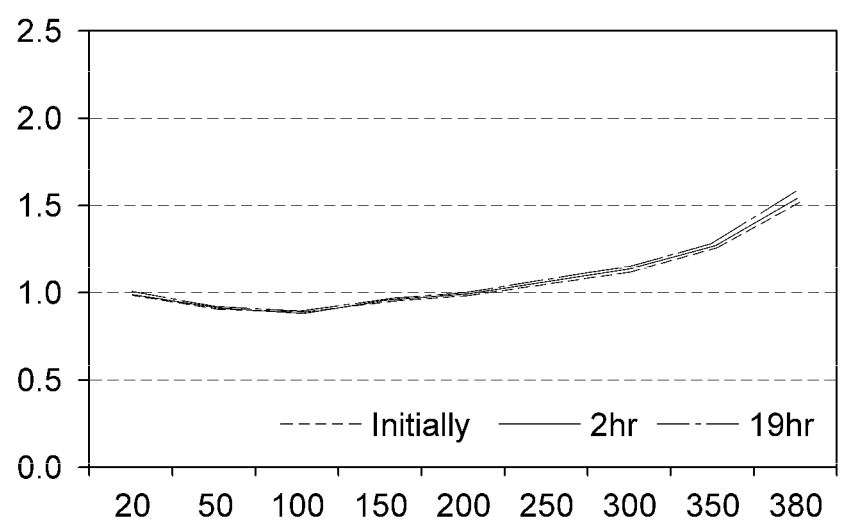

FIGS. 8A-9C show luminance changes over time in the light providing unit including the light guide member 300 that includes glass, the low refractive index layer 410, and the first barrier layer 431. In FIG. 8A-9C, a horizontal axis represents a distance from the light incidence surface IS (e.g., between the light incidence surface IS and the light opposing surface OS), and a vertical axis represents a relative magnitude of luminance. Each of the FIG. 8A-9C includes three lines. The three lines represent the luminance at the beginning (initially), after two hours, and after 19 hours, respectively. FIGS. 8A-8C show cases where the first barrier layer 431 includes $SiO_x$, and FIGS. 9A-9C show cases where the first barrier layer 431 includes $SiN_x$.

As illustrated in FIG. 8A, when the first barrier layer 431 that includes $SiO_x$ was deposited at about 200° C., a considerably large change in luminance occurred over time. However, as illustrated in FIG. 8B, when the first barrier layer 431 that includes $SiO_x$ was deposited at about 250° C. and at a higher density, the luminance change over time was significantly reduced, but the luminance change over time was still relatively large. Further, as illustrated in FIG. 8C, when the first barrier layer 431 that includes $SiO_x$ was deposited at about 373° C. and at an even higher density (e.g., at a much higher density), substantially no change in luminance occurred over time.

The light guide member 300 may include dangling bonds that were either previously present or generated during the treatment process of the light guide member 300, the low refractive index layer 410, and/or the first cover layer 430. An oxidation reaction, for example, may be promoted in the dangling bond by high-temperature deposition of the first barrier layer 431. Accordingly, when the first barrier layer 431 is deposited at a high temperature, any dangling bonds may be reduced or eliminated, and the initial change in luminance over time is reduced.

As illustrated in FIGS. 9A-9C, when the first barrier layer 431 that includes $SiN_x$ was deposited, a relatively low luminance change occurred over time, as compared with the case where the first barrier layer 431 includes $SiO_x$.

As illustrated in FIG. 9A, when the first barrier layer 431 that includes $SiN_x$ was deposited at about 200° C., a slight change in luminance occurred over time. However, as illustrated in FIG. 9B, when the first barrier layer 431 that includes $SiN_x$ was deposited at about 250° C. at a higher density, the luminance change over time was reduced. Further, as illustrated in FIG. 9C, when the first barrier layer 431 that includes $SiN_x$ was deposited at about 373° C. at an even higher density (e.g., a much higher density), substantially no change in luminance occurred over time.

The following Table 2 shows occurrence of luminance change over time and WVTR in Comparative Example and Exemplary Embodiments of the present invention.

The thicknesses of the cover layer 430 in Comparative Example and Exemplary Embodiments are all substantially equal to about 6000 Å.

In Comparative Example, when the cover layer 430 includes one barrier layer that is deposited at a relatively low temperature and at a relatively low density (e.g., only including the second barrier layer 432 according to an embodiment), an increase in luminance ranging from about 10% to about 40% with respect to an initial luminance occurred over time.

In Exemplary Embodiments 1 to 5, the thicknesses of the first barrier layer 431 and the second barrier layer 432 are substantially the same in each embodiment, having a thickness of about 2400 Å and 3600 Å, respectively, and their types are different from each other.

As in Exemplary Embodiments 1 to 5, substantially no change in luminance was observed over time, regardless of the types of the first barrier layer 431 and the second barrier layer 432.

In addition, WVTRs of Comparative Example and Exemplary Embodiments were all about 0.4 g/m²/day.

TABLE 2

| | Type/Thickness | | Luminance | WVTR |
|---|---|---|---|---|
| | First barrier layer 431 | Second barrier layer 432 | Change over Time | (g/m²/day) |
| Comparative Example | X | $SiO_x$/6000 Å or $SiN_x$/6000 Å | Occurred (10%-40%) | 0.4 |
| Exemplary Embodiment 1 | $SiN_x$/2400 Å | $SiN_x$/3600 Å | Not occurred | 0.4 |
| Exemplary Embodiment 2 | $SiO_x$/2400 Å | $SiO_x$/3600 Å | Not occurred | 0.4 |
| Exemplary Embodiment 3 | $SiN_xO_x$/2400 Å | $SiN_xO_x$/3600 Å | Not occurred | 0.4 |
| Exemplary Embodiment 4 | $SiN_x$/2400 Å | $SiO_x$/3600 Å | Not occurred | 0.4 |
| Exemplary Embodiment 5 | $SiO_x$/2400 Å | $SiN_x$/6000 Å | Not occurred | 0.4 |

Accordingly, the light providing unit BLU according to an embodiment may substantially suppress an initial change in luminance over time, and a process for aging to suppress the initial change in luminance over time may be omitted. In addition, the light providing unit BLU according to an embodiment may have a low WVTR.

As set forth hereinabove, a display device according to one or more embodiments may be improved in durability and display quality.

While the present invention has been illustrated and described with reference to the embodiments thereof, it will be apparent to those of ordinary skill in the art that various changes in form and detail may be made thereto without departing from the spirit and scope of the present invention and their equivalents.

What is claimed is:

1. A display device comprising:
 a light source configured to generate a light;
 a display panel configured to display images using the light;
 a light guide having at least one surface adjacent the light source; and
 an optical member between the light guide and the display panel,
  wherein the optical member comprises:
   a low refractive index layer on a light exit surface of the light guide;
   a first cover layer on the low refractive index layer; and
   a light conversion layer on the first cover layer, and the light conversion layer being configured to convert a wavelength band of an incident light,
  wherein the first cover layer comprises:
   a first barrier layer formed on the low refractive index layer by depositing a first inorganic material at a first temperature; and
   a second barrier layer formed on the first barrier layer by depositing a second inorganic material at a second temperature that is higher than the first temperature.

2. The display device of claim 1, wherein the first temperature is higher than or substantially equal to about 300 degrees (° C.), and the second temperature is lower than about 300° C.

3. The display device of claim 1, wherein a thickness of the first barrier layer is greater than or substantially equal to about 1200 Å and is less than about 4800 Å.

4. A method of manufacturing a display device, the method comprising:
   forming a low refractive index layer pattern on a substrate;
   forming a first cover layer on the low refractive index layer pattern; and
   forming a light conversion layer on the first cover layer, wherein forming of the first cover layer comprises:
      forming a first barrier layer by depositing a first inorganic material on the low refractive index layer pattern at a first temperature for a first time period; and
      forming a second barrier layer by depositing a second inorganic material on the first barrier layer at a second temperature for a second time period, the second temperature being higher than the first temperature.

5. The method of claim 4, wherein each of the first inorganic material and the second inorganic material comprises at least one of $SiO_x$, $SiN_x$, or $SiO_xN_x$.

6. The method of claim 4, wherein the first temperature is higher than or substantially equal to about 300° C., and the second temperature is lower than about 300° C.

7. The method of claim 4, wherein the first time period is greater than or substantially equal to about 60 seconds (s) and is less than about 120 s.

\* \* \* \* \*